United States Patent

[11] 3,617,613

| [72] | Inventors | James R. Benzinger |
| | | Orchard Park; |
| | | Canisius E. Kroth, Buffalo, both of N.Y. |
| [21] | Appl. No. | 768,440 |
| [22] | Filed | Oct. 17, 1968 |
| [45] | Patented | Nov. 2, 1971 |
| [73] | Assignee | Spaulding Fibre Company, Inc. |
| | | Tonawanda, N.Y. |

[54] PUNCHABLE PRINTED CIRCUIT BOARD BASE
8 Claims, 4 Drawing Figs.

[52] U.S. Cl. ........................................... 174/68.5,
117/212, 156/299, 161/82, 161/93, 161/98,
161/112
[51] Int. Cl. ........................................ H05k 1/00,
B32b 3/10
[50] Field of Search ............................. 161/82, 93,
98, 110, 112, 151, 185, 196; 156/3; 161/DIG. 4;
117/212; 174/68.5

[56] References Cited
UNITED STATES PATENTS

| 3,149,021 | 9/1964 | Goepfert et al. | 161/214 |
| 3,244,581 | 4/1966 | Miller | 161/186 |
| 3,258,387 | 6/1966 | Brown et al. | 161/140 |
| 3,310,457 | 3/1967 | Trebilcock | 161/185 |
| 3,393,117 | 7/1968 | Zolg et al. | 161/93 X |
| 2,477,900 | 11/1969 | Soukup | 161/214 X |
| 3,499,821 | 3/1970 | Zinbarg | 161/200 X |

Primary Examiner—Robert F. Burnett
Assistant Examiner—Roger L. May
Attorney—Bean & Bean ABSTRACT: A punchable printed circuit board base laminate formed by laminating thermosetting resin impregnated woven glass fiber sheets in which the glass yarn filament diameters are between about 3 and 14 microns to the surfaces of a thermosetting resin impregnated nonwoven fiber glass core, the fibers of which have diameters in the range of 0.2 to 14 microns and lengths of between 1/32 and 1/4 inch, the laminate thickness being from 1/32 to about 3/32 of which the core thickness is about from 50 to 90 percent.

PATENTED NOV 2 1971 3,617,613
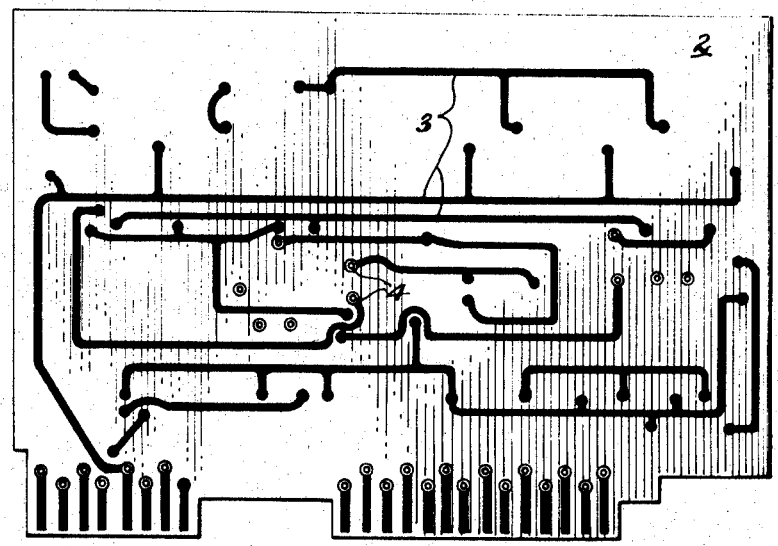
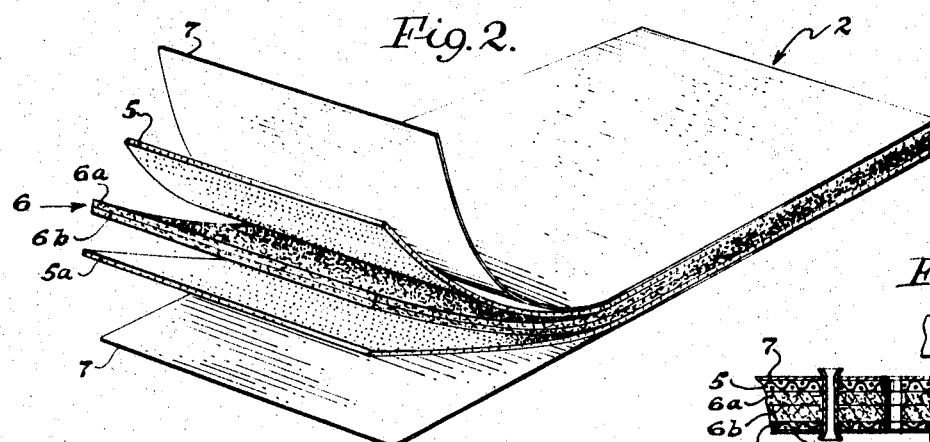
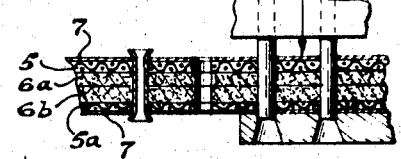
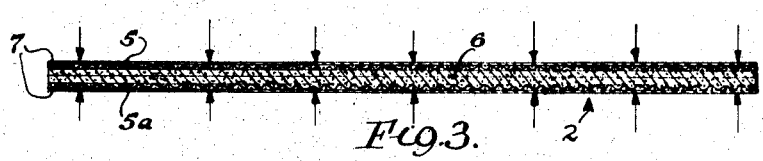
INVENTORS
JAMES R. BENZINGER
CANISIUS E. KROTH
BY
Bean & Bean
ATTORNEYS

PUNCHABLE PRINTED CIRCUIT BOARD BASE

BACKGROUND OF INVENTION

Epoxy-impregnated woven fiber glass sheet laminates having eight to 10 layers of woven glass and a resin content by weight of between about 40 percent and 50 percent have come into wide commercial use in the fabrication of printed circuit boards due to their high-mechanical strength, excellent electrical properties, resistance to chemicals used in processing of printed circuits, low water absorption, dimensional stability and thermal resistance. These laminates have become generally known by the military specification designation of GE for general purpose and GF for flame retardant or by the NEMA designations of G-10 for general purpose and FR-4 for flame retardant.

Upon attempting to hole punch laminates of this type, however, there is produced excessive fraying of the woven fiber glass filaments which results in excessive pullout of fibers from the laminate adjacent the area of the punched hole, which in turn interferes with subsequent fabricating operations, such as through hole plating and contact assembly.

Additionally, the punching characteristics of the woven fiber glass cause excessive wear of the punching elements. Accordingly, it has been found necessary to form holes in laminates of this type by expensive and time-consuming drilling operations. The difficulty involved with a drilling procedure will be apparent when it is considered that in many circuit applicators, several hundred holes must be drilled per square foot of board area.

Recently, it has been proposed to form circuit boards of nonwoven fiber glass impregnated with epoxy resin with a view to enhancing the punching characteristics thereof and to decrease the overall cost of both the laminates and subsequent hole-forming operations. However, it has been found impossible to fabricate nonwoven fiber glass laminates with sufficient strength to meet the minimum structural limitations specified for many uses of woven fiber glass circuit boards without greatly exceeding the maximum specified thickness thereof. Further, it has been found impossible to resin bond circuit-forming copper foil to the nonwoven fiber glass laminate during the laminating operation. Rather, it is necessary to adhesively bond the foil to the base laminate, whether the foil is joined to the base laminate during or subsequent to the laminating operation. An additional practical limitation on the use of nonwoven fiber glass laminates is the low tensile strength of the unmolded fiber mats or sheets, which makes it difficult or impossible to impregnate and dry the glass sheets in commercial treaters without the utilization of costly support and transporting film carriers which must subsequently be peeled from the sheets prior to mold forming thereof and/or the application of metal foil to the surfaces of the molded laminate.

SUMMARY OF THE INVENTION

It has now been discovered that a low-cost, readily punchable printed circuit board base laminate may be formed by laminating epoxy impregnated woven fiber glass sheets to the surface of an epoxy-impregnated nonwoven fiber or glass core, which composite laminate possesses strength characteristics above the minimal strength specified for conventional woven fiber glass epoxy laminates. While preferably the core is in paper form, it may be a mat formed by laying together continuous filaments in a random manner.

The laminate thus produced is characterized by negligible tear-out or fraying of fiber adjacent to the area of the punched holes and does not subject punching dies to wear in excess of that found to be experienced when punching nonwoven fiber glass boards. Further, the provision of woven fiber glass facing sheets on the nonwoven fiber glass core, permits circuit-forming copper foil to be bonded directly to the laminate during the mold-forming operation, if desired.

Unexpectedly, it has been found that laminates formed in accordance with the present invention are preferable over 100 percent nonwoven fiber glass laminates in that holes may be punched closer together without fear of cracking the laminate.

In the practice of the present invention any electrically insulating thermosetting resin in addition to epoxy type resins may be used to impregnate the nonwoven core-woven facing sheet composite, as long as the resin employed meets conventional circuit board requirements as to strength, electrical properties, resistance to chemicals used in processing of printed circuits, low water absorption, dimensional stability and thermoresistance; is capable of being punched; and is compatible with the fibrous material employed in forming the core and facing sheets. As long as the epoxy or other resin composition employed is capable of being punched when incorporated in the composite, variation in hardness of the resin, although varying the force necessary to effect punching, does not markedly influence the ability of the present base laminate to be cleanly punched without excessive pullout of fiber adjacent the area of the punched hole.

An additional important feature of the present invention is that the woven fiber glass facing sheets may be employed to support the relatively weak fiber glass core during preliminary forming thereof and/or subsequent processing operations. This not only negates the need for employing films or belts to maintain the integrity of the core during processing, but insures that both the facing sheet and core are subject to the same impregnating and prepreg curing conditions.

Specifically, the invention contemplates the utilization of a single fiber glass facing sheet to transport a previously formed half-thickness core during the resin impregnating and prepreg curing operations within a conventional horizontal treater; the weight of the facing sheet and half-core combination being adjusted so that by simply inverting the combination on another combination with the half cores thereof in engagement a final composite of desired thickness is obtained after laminating under heat and pressure.

In an alternate process susceptible of use in both horizontal and vertical treaters, a preformed nonwoven glass core of a desired thickness is sandwiched between two facing sheets of woven fiber glass, which functions to support the core during processing of the facing sheet-core composite.

In another process susceptible of use in forming the laminate of the present invention, a non-self-supporting fiber glass core may be formed directly on a woven glass fiber facing sheet and then transported during processing operations in accordance with one of the procedures aforesaid.

DRAWINGS

The invention will be more fully understood by reference to the following description taken with the accompanying drawings, wherein: FIG. 1 illustrates a typical printed circuit board;

FIG. 2 shows the circuit board base laminate formed in accordance with the present invention partially opened in order to clearly show the individual lamina thereof;

FIG. 3 generally illustrates how the laminate prepreg when covered with metallic circuit-forming sheets is compressed to form a finished composite; and FIG. 4 shows the manner in which a plurality of holes may be simultaneously punched in the finished composite.

DETAILED DESCRIPTION

In FIG. 1 there is shown for purposes of illustration, a typical circuit board 1 of between about 1/32 and 3/32-inch thickness having a conventional high-strength insulated base laminate 2, which is formed by laminating together a plurality of epoxy-impregnated woven fiber glass sheets. After the base laminate is formed a thin copper or other electrically conductive metallic sheet, which had previously been bonded to the base laminate either during or subsequent to forming thereof, is etched to produce a plurality of circuit elements 3. Thereafter, base 2 is drilled to provide a plurality of holes, which are to receive metallic terminal elements 4 or which are to be coated with a suitable electrically conductive material, such as copper.

Now referring to FIGS. 2–3, it will be understood that in accordance with the preferred embodiment of the present invention an improved high-strength insulated base laminate is formed by laminating under heat and pressure an epoxy-impregnated composite including a pair of woven fiber glass facing sheets 5, 5a and a nonwoven fiber glass core generally designated as 6. As in conventional circuit board practice, one or both of the woven fiber glass facing sheets are cladded either during or subsequent to the laminating operation with a thin copper or other electrically conductive metallic sheet to produce a final thickness composite of between about 1/32 and 3/32 inches. Presently employed copper circuit-forming sheets normally have thicknesses of upwards of about 0.0028 inches. The thus formed base laminate either with or without one or more copper sheets is characterized by its ability to be die punched, as indicated in FIG. 4, without excessive pullout of fiber from the laminate adjacent the area of a punched hole.

The woven facing sheets 5, 5a may be identical to those presently in use for forming conventional multilayer woven fiber glass base laminates or may be varied therefrom to facilitate control of composite thickness or strength properties.

Conventional circuit board plain-weave glass fabrics are preferred, however, because they are readily available at low cost and offer less resistance to hole punching than fabrics having more complex weaves. For presently available fabric weaves, glass yarn filament diameters of between about 3 and 14 microns may be utilized. However, as yarn filament diameter increases, punching characteristics become poor and there is a tendency for the surface of the base laminate to become wavy in appearance.

Core 6 may be either formed by processing fiber glass in a conventional rotoformer or a fourdrinier to produce a paper in which fiber lengths are predominantly between about 1/32 and 1/4 inches or by air laying continuous or discontinuous glass fiber in forming a mat. Core 6 may be at full thickness when formed or be formed in half-thickness sheets 6a, 6b, as indicated in the drawings, depending on the method employed in forming the composite, which will be more completely described. A suitable binder, which is compatible with respect to the core fibers and the impregnating resin is provided to maintain cohesiveness of the core during prepreg processing to be described.

Core-forming glass fibers having diameters of between about 0.2 and 14 microns have been found to be susceptible of use. However, glass fiber diameters of between 3 and 6 microns are preferred, in that fiber diameters of less than about 3 microns are expensive and fiber diameters much in excess of about 6 microns produce a board having progressively poorer punching characteristics.

For base laminates of between about 1/32 and 3/32-inch thicknesses required by conventional circuit board applications core thicknesses ranging from between about 50 percent and 90 percent of the base laminate, , respectively, are preferred from the standpoint of both strength and punchability.

The resin content of the base laminate on a weight basis may vary between about 30 percent and 90 percent, with a preferred range of between 60 percent and 75 percent. Base laminates having resin contents below 60 percent progressively increase in cost and the difficulty of forming the laminate without the occurrence of resin voids or dry spots and are progressively more difficult to punch. While laminates having resin contents above 75 percent are progressively easier to punch, such laminates are difficult to laminate due to the tendency for the plies or lamina to tear and require increasing laminate curing times.

As by way of example, composite base laminate test specimens of 1/16-inch thickness was prepared in accordance with the present invention using the following materials:

Fiberglass Paper Core
    80 pbw Glass fiber (boro-silicate, 3–6
      micron diameter, 1/32–1/4 inch length)
    20 pbw Reactive acrylic binder
Woven Fiberglass Fabric (Type E)
    Style 7628 volan finish plain-weave
    75-1/10 warp and fill yarn construction
    5.8 oz. per sq. yd. weight
    42×32 per inch yarn count
    0.007" thickness
Epoxy Resin Formulation
    55.39% Ciba Araldite Epoxy Resin 8011 N 80
    25.54% dimethyl formamide
    12.42% ethylene glycol monoethyl ether
    2.66% CAT–10
    1.73% dicyandiamide
    1.46% antimony trioxide
    0.11% benzyl dimenthyl amine CAT–10, a catalyst produced by the Photocircuits Corporation, was added to permit the base laminate to be electroless plated with copper.

A prepreg was formed by placing fiber glass paper having a thickness half that of the core thickness desired, on woven fiber glass fabric and passing the paper and fabric through a conventional horizontal treater, wherein they were first impregnated by the above epoxy formulation to a resin content of 70 percent by weight and finally dried and precured at 325° F. for about three minutes to effect partial polymerization of the resin to that commonly known as the "B" stage. Adjustment of impregnation and curing conditions were maintained in order to obtain a resin flow rate of about 10 percent, which is a conventional measure of resin flow under laminating heat and pressure conditions. Upon emergence from the treater, the resin content of the fabric was determined by conventional burnout test to be 20 percent. The prepreg was cut into sheets and one of a pair of such sheets inverted to place core surfaces of the sheets in engagement to form a prepreg composite having the desired core thickness. Thereafter, copper foil sheets were arranged on the surfaces of the prepreg composite and a plurality of such assemblies, relatively spaced by suitable separating metal plate, placed in a hydraulic press for 45 minutes under a pressure of 500 p.s.i. and at a temperature of 350° F. to effect complete polymerization of the resin to that commonly known as "C" stage. The finished laminate was then cooled to about 125° F. and the resin of the fabric facings determined to be 40 percent. The increase in resin content of the woven fabric is believed occasioned by the migration or flow of resin from the core during the laminating operation.

Similarly prepared test specimens were made in 1/32 and 3/32-inch thicknesses. The 3/32-inch test specimen employed identical materials to that of the 1/16-inch test specimen, whereas the 1/32-inch specimen differed only from the 1/16-inch specimen in that the following fabric was employed:

1/32 inch Specimen Fabric (Type E)

Style 1165 volan finish plain-weave
Warp 450—1/2
Fill 150—1/0      yarn construction
3.71 oz. per sq. yd. weight
60×52 per inch yarn count
0.0047" thickness The first test specimens were evaluated and found in all cases to exceed the military requirements (specification MIL-P-13 949D) for GF type epoxy-impregnated plural layer fiber glass fabric base laminate.

For purposes of comparison, GF type plural layer fiber glass fabric base laminate reference specimens of 1/32, 1/16 and 3/32 thickness were prepared using resin and fabric materials identical to those employed in forming the first test specimens. Each of the specimens were punched by a conventional plural hole punching machine. Inspection of the first test specimens revealed that the holes therein were cleanly punched and the absence of fiber pullout on the bottom surface of the specimens adjacent the holes. On the other hand, holes punched in the reference specimens gave a ragged appearance and there were frayed and loosened fibers in the holes and on the bottom surface of the specimens surrounding each of the punched holes.

Also, for purposes of comparison, reference specimens of 1/32, 1/16 and 3/32-inch thickness were prepared using only resin and core fiber materials of a type employed in forming the first test specimens. These reference specimens failed to meet the military requirements for GF type base laminates and it was found that they tended to rupture or disintegrate when attempts were made to punch 0.05 inch diameter holes therein at a 0.03 inch spacing between holes, which was readily accomplished with the first test specimens.

Similar test specimens were prepared using alternative methods of prepreg formation. In a first alternative method employed, a full thickness paper core was faced on each side thereof with a woven fiber glass fabric and the composite passed through a conventional horizontal treater under the conditions set forth in the preferred procedure. After cutting the prepreg into sheets, copper foil sheets were arranged on the surfaces of the prepreg and a plurality of such assemblies, relatively spaced by suitable separating metal plates, placed in a hydraulic press for 45 minutes under a pressure of 500 p.s.i. and at a temperature of 350° F. The resultant composite had an identical appearance, structural properties and punchability characteristics as the test specimens prepared in accordance with the preferred method described above.

Further, additional test specimens were prepared by a second alternative procedure, which corresponded exactly to the preferred procedure discussed above, except that a half core was formed by depositing continuous glass filaments as a mat on a supporting fiber glass fabric web prior to initiation of the impregnating operation. Again, these test samples were readily punchable and corresponded in appearance and structural performance to the test specimens previously described.

Other test specimens of 1/32 to 3/32-inch thickness were made using identical materials and process employed in forming the first test specimens, but wherein resin content of the specimens vary. It was observed that the ease with which the test specimen could be punched increased with resin content from a 30 percent content, below which a laminate could not be formed without resin voids, to a 90 percent content above which great difficulty was encountered in laminating without producing tearing in the lamina and excessive curing times. It was determined that best overall results were obtained with laminates having resin contents of between about 60 and 75 percent by weight.

Further, experiments were conducted with test specimens which were identical in composition to the first test specimens except that the glass core fibers were varied from the 3–6 micron range. The results demonstrated that while glass fiber diameters of between 0.2 and about 14 microns were susceptible of use, that the 3–6 micron range was preferable from the standpoint of both punchability and cost considerations.

While the preferred embodiment of the present invention has been described with particular reference to circuit board base laminates formed of fiber glass and an epoxy binder, other materials may be utilized with varying degrees of acceptability. Other thermosetting resins susceptible of use, include Teflon phenol formaldehyde, polyesters, polyimide melamine and silicones. Other fibers which may be used separately or in combination with a predominate amount of glass fiber include those of boron, polymide, dacron, cellulose and combinations thereof. In each instance, the reactive binder desirably employed to promote cohesion of core fibers prior to the laminating operation will vary, depending upon the composition of the fibers and the impregnated resin.

We claim:

1. A composite glass fiber-epoxy resin laminated sheet adapted to be punched through, comprising a core sheet of nonwoven glass fiber having diameters in the range of 0.2 to microns and of lengths between 1/32 and 1/4-inch, and woven glass fabric facings on both sides of the core sheet in which the glass yarn filament diameters are between about 3 and 14 microns, the laminate thickness being from 1/32 to about 3/32 inch, of which the core thickness is from 50 to 90 percent, and epoxy resin binding the facing sheets to be the core sheet, with the resin content of the laminate being from 30 to 90 percent.

2. A composite glass fiber-epoxy resin laminated sheet according to claim 1, having conductive metal joined to the exterior major surfaces thereof and adapted, on each such major surface, to be converted to printed circuits with connections between said circuits, by holes punched through the conductive metal and laminate and electrical connections made at or through such holes.

3. A composite conductive metal-glass fiber-epoxy resin laminated sheet according to claim 2 wherein the conductive metal sheets are laminated to the woven glass fabric facings with epoxy resin, holes are punched through the laminate and electrical connections are made to the metals of the laminate through said holes.

4. A composite conductive metal-glass fiber-epoxy resin laminated sheet according to claim 3 wherein the conductive metal is formed into paths, creating, with electrical connections between the conductive metals on both sides of the laminated sheet, a "printed circuit."

5. A composite glass fiber-epoxy resin laminated sheet according to claim 1 wherein the nonwoven glass fibers of the core sheet have diameters in the range of 3 to 6 microns and the resin is from 60 to 75 percent by weight of the laminate.

6. A composite glass fiber-epoxy resin laminated sheet according to claim 5 wherein the core sheet comprises a plurality of thinner core sheets laminated together.

7. A composite glass fiber-epoxy resin laminated sheet according to claim 6 having copper foil sheets joined to the exterior major surfaces thereof, holes punched through said sheets and the glass fiber-epoxy resin laminate, and electrical connections made through said holes, whereby a "printed circuit" laminate board is produced.

8. A composite copper foil-glass fiber-epoxy resin laminate according to claim 7 wherein the nonwoven glass fiber core sheet is made up of a plurality of glass fiber paper sheets laminated together and the woven glass fabric facings are of plain woven fabric design.

* * * * *

UNITED STATES PATENT OFFICE
CERTIFICATE OF CORRECTION

Patent No. 3,617,613        Dated November 2, 1971

Inventor(s) James R. Benzinger et al

It is certified that error appears in the above-identified patent and that said Letters Patent are hereby corrected as shown below:

Column 6, line 14, "0.2 to microns" should read -- 0.2 to 14 microns --.

Signed and sealed this 24th day of October 1972.

(SEAL)
Attest:

EDWARD M. FLETCHER, JR.
Attesting Officer

ROBERT GOTTSCHALK
Commissioner of Patents